United States Patent [19]

Gaertner

[11] 4,213,164

[45] Jul. 15, 1980

[54] ELECTRONIC PROTECTION CIRCUIT INCORPORATING VOLTAGE DIVIDER SENSING, GATING AND TRIGGERING

[75] Inventor: Robert F. Gaertner, San Marcos, Tex.

[73] Assignee: Esquire, Inc., New York, N.Y.

[21] Appl. No.: 915,395

[22] Filed: Jun. 14, 1978

[51] Int. Cl.² .............................................. H02H 3/20
[52] U.S. Cl. ........................................ 361/56; 361/91
[58] Field of Search ..................... 361/56, 55, 54, 91, 361/110, 111, 86, 87, 88, 89, 90, 100; 323/21; 340/662; 307/252 K, 252 P, 252 R, 252 F, 252 T

[56] References Cited

U.S. PATENT DOCUMENTS

| | | | |
|---|---|---|---|
| 3,214,667 | 10/1965 | Foster et al. | 307/252 P X |
| 3,729,652 | 4/1973 | St. Clair | 361/56 |
| 3,790,856 | 2/1974 | Hutchinson | 361/91 X |
| 4,135,223 | 1/1979 | Holmes | 361/56 |

OTHER PUBLICATIONS

"abc's of Zener Diodes," by Rufus Turner, pp. 26–29 and 50–53, 1974, Howard W. Sams & Co. Inc., Indianapolis, Ind.

Primary Examiner—Patrick R. Salce
Attorney, Agent, or Firm—Frank S. Vaden, III

[57] ABSTRACT

A protection circuit for producing one or more triggers in the presence of a monitored overvoltage condition employing a complex voltage divider network including slow-acting breakover semiconductor devices for sensing ac voltage overloads in either or both polarities thereof, and operating gated semiconductors by controlling the voltages applied to both the gates and the main terminals thereof, which, in turn, discharge capacitors for trigger production. Monitoring may be with respect to supply voltage, power supply output voltage or one or more independent voltages.

9 Claims, 2 Drawing Figures

ELECTRONIC PROTECTION CIRCUIT INCORPORATING VOLTAGE DIVIDER SENSING, GATING AND TRIGGERING

BACKGROUND OF THE INVENTION

1. Field of the Invention

This invention relates to protection circuits operating in conjunction with normally stable power supplies for providing power to a system of high intensity, gaseous discharge lamps and therefore susceptible to injury from a supply voltage exceeding even a momentary voltage level beyond a certain limit, and sensing even an overload of one polarity of ac voltage.

2. Description of the Prior Art

There are many fuses, circuit breakers and the like that operate in the presence of a voltage overload to open an incoming supply source to prevent injuring a delicate electrical device and/or electrical circuit. These protection devices are satisfactory when protecting devices and circuit components which themselves are capable of tolerating, at least for a short period of time, a circuit overload condition without appreciable injury, such as might be caused by the application of high voltage and attendant high current caused by a short circuit.

There are, however, circuits and devices that are incapable of tolerating even a momentary overload condition and, therefore, such protection devices and-/or circuits are not satisfactory in preventing injury from occurring. There are many other installations where, although the protected devices or components can tolerate a bit of overvoltage, their life or subsequent performance is impaired to some extent when subjected to a momentary surge. That is, a surge may not cause their failure, but will degrade their vitality.

One situation that can cause an unexpected surge to occur is one involving electrical storage devices, such as capacitors and inductors, that can discharge or untimely cause a current or voltatge to occur back into a power supply network, thereby causing related devices connected to the power supply to experience overvoltage or overcurrent conditions even though the source or supply voltage remains within limits. A circuit which is suitable for providing some protection under such conditions is disclosed in FIG. 7 and related illustrations of copending Patent Application Ser. No. 654,926, filed Feb. 2, 1976, now abandoned in favor of continuing application Ser. No. 898,309, now U.S. Pat. No. 4,134,044 commonly assigned to the same assignee. A phototransistor controlled by the brightness of a light emitting diode connected across the dc output of the power supply determines the application of gate voltage to a triac. This conduction timing "regulates" the output even though there is no regulation of the ac input to the power supply. The circuit is protected against surges of ac input by the gating of another triac that operates a coil connected for opening its contacts in series with the source line.

Although the circuit does open the line in the presence of sustained overvoltage input conditions, its operation is somewhat hesitant when the voltage conditions are borderline. Further, the dc timing connection does provide regulation in the case of a dc voltage output above a predetermined danger level, but the action does not ensure that a sudden surge will result in opening the power circuit. That is, there is no absolute protection provided.

Patent Application Ser. No. 803,365, filed June 3, 1977 now U.S. Pat. No. 4,135,223, and also assigned to the same assignee, discloses a circuit for sensing an ac voltage overload condition using a bridge circuit for first converting the ac to dc and a pair of photodiode-phototransistors (optocouplers) for switching a gated semiconductor, and hence producing suitable triggers for actuating power switches.

Although such circuit has proven to be an improvement over previous circuits, the interposing of the bridge has introduced delays in sensing the overload before actual protection switching begins. Furthermore, the circuit has proven susceptible to stray voltages to an unsatisfactory degree. Gating isolation between polarities has not been altogether satisfactorily achieved and there has been insufficient isolation between the gate and main terminal signals on the gated semiconductor, thereby creating occasional false gating.

Therefore, it is a feature of the present invention to provide an improved electronic protection circuit operating with respect to sensing an ac voltage for overload condition without using either a bridge or an optocoupler.

It is another feature of the present invention to provide an improved electronic protection circuit utilizing a gated semiconductor operated in such a manner so as to isolate the gate and main terminals thereof.

It is still another feature of the present invention to provide an improved electronic protection circuit utilizing a voltage divider network for effectively sensing a voltage overload of a single polarity, while utilizing a slow-acting breakover device ahead of gating a semiconductor so as to prevent premature triggering because of stray noise.

SUMMARY OF THE INVENTION

The embodiment of the present invention disclosed herein is an electronic protection circuit which monitors independently both polarities of an ac voltage, preferably the source voltage to the power supply, and a dc voltage, preferably the output voltage from the power supply which is connected to operate a load system capable of influencing the dc voltage output condition of the power supply. The ac monitoring system includes a resistor divider for independently determining when there is a voltage overload of either polarity and acting through a separate slow-acting breakover device for each polarity to gate a respective transistor having its gate isolated from its main terminals and having a charge network connected to produce an output when the respective monitored voltage exceeds a predetermined level.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered

IN THE DRAWINGS

Figure 2:
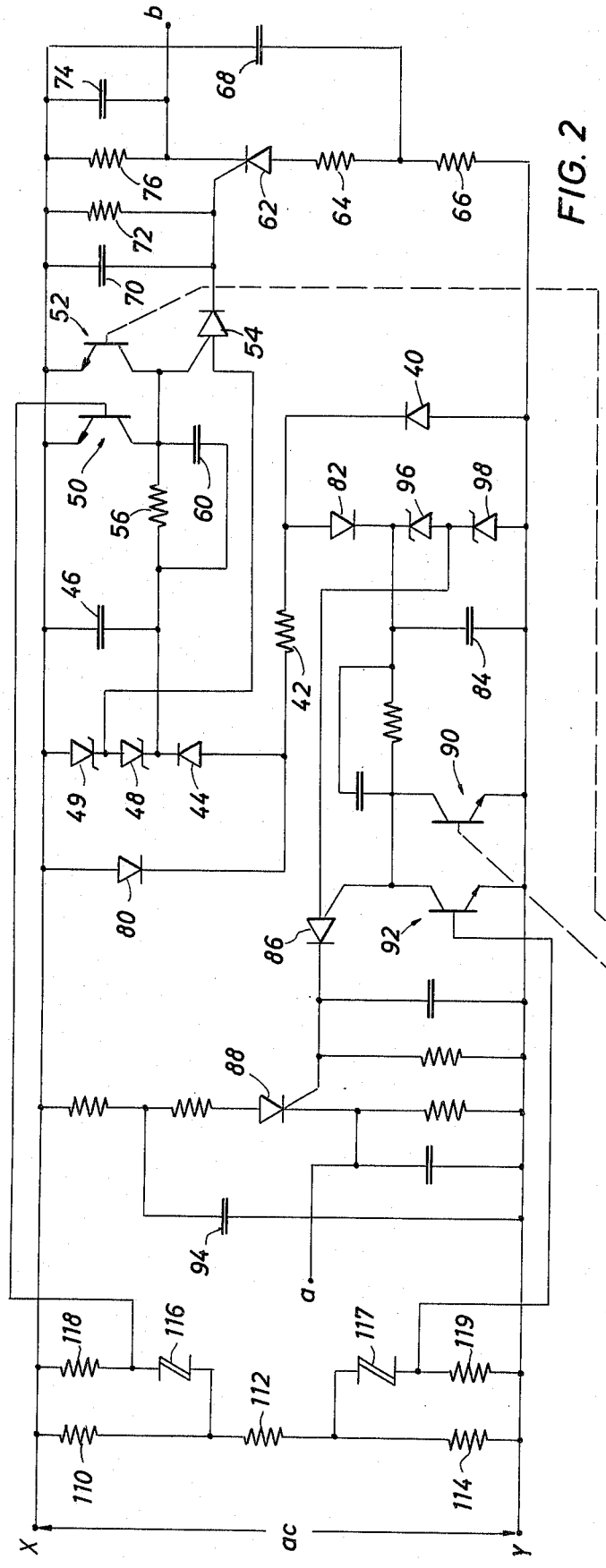
Figure 1:
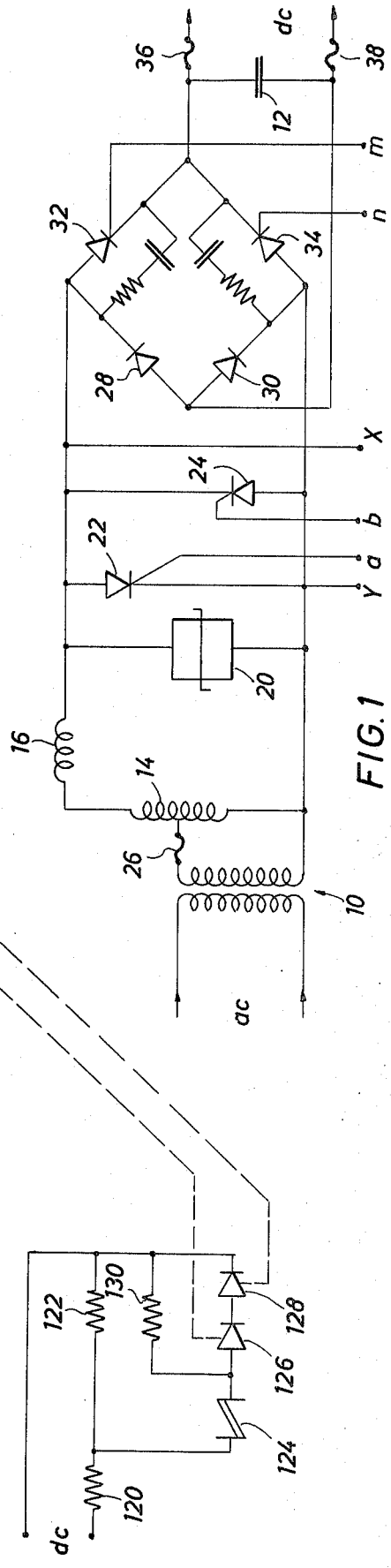

FIG. 1 is a schematic diagram of a power supply operable in conjunction with triggers from the protection circuit of the preferred embodiment thereof shown in FIG. 2; and FIG. 2 is a schematic diagram of a preferred embodiment of a protection circuit in accordance with the present invention.

DESCRIPTION OF ILLUSTRATED EMBODIMENT

Now referring to the drawings and first to FIG. 1, the power section of a power supply capable of being protected by the protection device to be hereinafter described, is illustrated. Basically, the circuit converts an ac source voltage applied across the input, which may be through isolation transformer 10, to a desirable dc voltage applied at the output across output capacitor 12.

The input voltage level is transformed in transformer 10 and further boosted in tapped transformer 14 before passing through inductor 16, preceding varistor 20, connected across the lines. Inductor 16 limits the incoming current during the induction time and, with varistor 20, help remove transients that may be present in the applied ac source voltage.

Back-to-back SCR's 22 and 24 are connected across the ac line of the power supply, the cathode of SCR 22 being applied to the line marked "Y" and the cathode of SCR 24 being connected to the line marked "X". The gate of SCR 22 is connected to terminal "a" and the gate of SCR 24 is connected to terminal "b" for external triggering in a manner to be hereinafter described. It may be seen, however, that the application of a trigger signal to an SCR effectively shorts together lines X and Y and thereby provides an overload current for the overload protection device, sometimes referred to as an overload cut out device or fuse 26, located in the line to the centertap of transformer 14.

A rectifier in the form of a bridge circuit is connected to lines X and Y, the basic bridge comprising back-to-back diodes 28 and 30 connected across lines X and Y and back-to-back SCR's 32 and 34 connected front-to-front across lines X and Y. The output from the bridge circuit is then taken from the common connection of the diodes and the common connections of the SCR's. It may also be noted that the SCR's are each connected in parallel with a series combination of a resistor and a capacitor to provide snubber operation. The gate of SCR 32 and the gate of SCR 34 are connected respectively to terminals m and n. These connections provide for the phase operation of the SCR as controlled by an external circuit. Such phase control is convenient for varying the dc output of the overall circuit for application to a load desirably connected to receive such treatment. Such a load might be a lamp drive circuit. The output is protected by fuses 36 and 38.

It may be noted that although a complex bridge circuit is shown in the preferred illustrated embodiment, other rectifiers including bridge circuits, such as a conventional bridge circuit comprising four diodes, may be employed in alternate power section embodiments.

Now referring to the circuit illustrated in FIG. 2, a protection circuit is shown for applying a trigger pulse to either terminal a or b in the presence of a sensed overload condition. It may be noted, the circuit is connected, as illustrated, for sensing a predetermined level across terminals X and Y of the circuit shown in FIG. 1. An applied ac source voltage of a first polarity applied to terminal Y causes a build up of voltage through diodes 40, across resistor 42 and through diode 44, the charge being stored in capacitor 46 as determined by Zener diodes 48 and 49.

Resistors 110, 112 and 114 are connected across terminals X and Y to provide a voltage divider and the means by which overvoltage conditions are sensed for subsequent circuit operation. The junction between resistors 110 and 112 provides a convenient sensing point for sensing an overvoltage condition of positive polarity and the junction between resistors 112 and 114 provides a convenient sensing point for sensing an overvoltage condition of negative polarity.

SBS 116 and load resistor 118 therefor are connected in series with each other and in parallel with resistor 110. SBS 117 and load resistor 119 therefor are connected in series with each other and in parallel with resistor 114. The junction between SBS 116 and resistor 118 provides the base drive connection to transistor 50 and the junction between SBS 117 and resistor 119 provides the base drive connection to transistor 92.

SBS 116 and SBS 117 are breakover semiconductor devices having a response time of about ½ of a microsecond. An extremely sharp spurious spike slighlty above the predetermined level for causing conduction breakover will not cause breakover unless it has a duration greater than ½ of a microsecond. A voltage of this appreciable duration shows an actual voltage overload against which the circuit is designed to protect against being applied to the operated circuit. In other words, SBS 116 and SBS 117 are relatively slow-acting elements.

The connection point between diode 44 and capacitor 46 is connected to the gate of PUT 54 via the parallel network of resistor 56 and capacitor 60. The junction point between Zener diodes 48 and 49 is connected to the anode of PUT 54. By these connections, the anode may be biased at a voltage considerably less than the bias on the gate. For example, the bias voltage applied to the anode may be 13 volts while the bias voltage applied to the gate may be 26 volts. Hence, any spurious noise on the anode is isolated from activating the gate of the PUT.

It may be seen that when an overvoltage condition is sensed so as to cause conduction of transistor 50, gate voltage is supplied to PUT 54 for causing it to conduct and therefore discharging the charge built up on capacitor 46. The cathode of PUT 54 is connected to the gate of SCR 62. The cathode of SCR 62 is connected to terminal b and the anode is connected to resistor 64, a portion of a voltage divider with resistor 66. The junction of the voltage divider is connected to capacitor 68, a storage device connected to line X. Resistor 66 is connected back to line Y. The cathode of PUT 54 is connected to capacitor 70 and resistor 72 to provide noise immunity and the cathode of SCR 62 is connected to capacitor 74 and resistor 76 for the same purpose.

It may be seen that with the application of a gate voltage to SCR 62 by PUT 54, the charge on capacitor 68 is allowed to discharge through the SCR to terminal b. Further, the voltage established by Zener diode 49 applied to the anode of PUT 54 further progresses through the terminals of SCR 62 to also be supplied to terminal b. It is this overall trigger which is applied to terminal b of the power supply section shown in FIG. 1.

In similar fashion, the opposite polarity of the ac voltage applied across terminals X and Y builds up a charge through diodes 80 and 82 to capacitor 84, as determined by Zener diodes 96 and 98. Discharge of capacitor 84 is from Zener diode 98 through PUT 86 and SCR 88 with the conduction of transistor 92. With the conduction of SCR 88 capacitor 94 is discharged to add to the trigger signal applied to terminal a. It is this trigger signal which is applied to terminal a of the power section illustrated in FIG. 1.

In response to the sensing circuit just described, an output of a given polarity will result in an output to cause the breakover of either SBS 116 or 117. An overvoltage in both polarities causes the breakover of both SBS 116 and 117 to cause conduction of both transistors 92 and 50, respectively. Depending upon which of capacitors 46 and 84 is discharged, an output will result on either or both terminal b and terminal a. When both polarities of the sensed voltage across terminals X and Y are above a predetermined level, then both terminals b and a will receive an output trigger. As previously noted these outputs trigger the gates on SCR's 22 and 24 to cause opening of overload current device 26 in the power section of the power supply.

The operation of phototransistor 52 and 90 operate substantially in the same manner as transistors 50 and 92, respectively, with respect to gating PUT's 54 and 86, respectively. The triggering of these phototransistors is with respect to detecting dc overvoltage, as described below.

The protection circuit shown in FIG. 2 can also detect for the presence of a dc voltage exceeding a predetermined level. The monitored dc voltage is applied across the voltage divider comprising resistors 120 and 122, resistor 122 being connected in parallel with SBS 124, photodiode 126 and photodiode 128. Bleeder resistor 130 is connected across photodiodes 126 and 128. Photodiode 126 is connected to operate in conjunction with phototransistor 90 and photodiode 128 is connected to operate in conjunction with phototransistor 52. Hence, when a dc voltage above the predetermined level set by the circuit is exceeded, SBS 124 conducts, causing diodes 126 and 128 to cause conduction of phototransistors 90 and 52. This results in a trigger being applied to terminal a and b, from charges built up on capacitors 84 and 46, respectively.

It may be desirable to monitor the dc output of the circuit shown in FIG. 1 as that voltage applied to the dc terminals to be monitored in the circuit shown in FIG. 2.

For example, the turn-on time of SCR's 32 and 34 as determind by the signals applied to terminals m and n, respectively, may be such as to cause a dc voltage output exceeding the desirable operating level independently of whether or not an applied ac voltage to the overall circuit has been exceeded.

It may also be noted that the ac voltage causing the build up on capacitors 46 and 84 may be independent of the ac voltage being monitored for overvoltage protection. Conveniently, however, this is the same ac voltage which is applied to terminals X and Y of FIG. 1.

While a particular embodiment of the invention has been shown and described, it will be understood that the invention is not limited thereto, since modification may be made and will become apparent to those skilled in the art. For exmple, the circuit has been described in conjunction with sensing an amplitude level exceeding a predetermined amount. It may be used to monitor a rate of change exceeding a predetermined rate, such as a condition which has not yet reached a large amplitude but is too rapidly approaching one. Such a simplified circuit may employ cathode-to-cathode connected Zener diodes, the anodes of which are connected across a capacitor. A rapid rate of change will then create a very high amplitude exceeding the predetermined sensing level for the circuit shown in FIG. 2, while a normally changing rate of change will not create such a high amplitude voltage to occur.

What is claimed is:

1. An electronic protection circuit for providing a trigger to a circuit to be protected in the presence of an ac source voltage exceeding a predetermined amplitude, comprising
   charge storage means responsive to storing a charge from a first polarity of an applied ac voltage,
   switch means connected to the ac source operably switched on when the first polarity of the ac source exceeds a predetermined amplitude for a predetermined length of time, and
   gated semiconductor means connected to said charge storage means and to said switch means, switching on of said switch means gating on said gated semiconductor means to permit the charge stored on said charge storage means to be applied therethrough as an outgoing trigger.

2. An electronic protection circuit in accordance with claim 1, wherein said gated semiconductor means includes a gate network and an anode network and wherein said charge storage means includes a diode and, serially connected and oppositely poled thereto, Zener diode means, said Zener diode means being connected to the gate network of said gated semiconductor means and to the anode network of said gated semiconductor means, said Zener diode means including isolation means for separating said gate network and anode network, the gating on of said gated semiconductor applying a further gate signal to said gate network, an outgoing trigger passing from the anode network through said gated semiconductor means when said gated semiconductor means is gated on.

3. An electronic protection circuit in accordance with claim 1, wherein said gated semiconductor means includes a gate network and an anode network and wherein said charge storage means includes a diode and, serially connected and oppositely pole thereto, a first Zener diode and a second Zener diode, said first Zener diode of higher voltage being connected to the gate network of said gated semiconductor means, said second Zener diode being connected to the anode network of said gated semiconductor means, the gating on of said gated semiconductor means applying a further gate signal to said gate network, an outgoing trigger passing from the anode network through said gated semiconductor means when said gated semiconductor means is gated on.

4. An electronic protection circuit in accordance with claim 1, wherein the applied ac voltage connected to the charge storage means is the ac source voltage.

5. An electronic protection circuit in accordance with claim 1, wherein said switch means includes a slow-acting semiconductor breakover device.

6. An electronic protection circuit in accordance with claim 1 and including voltage divider means connected to the ac source voltage to provide a sensing point for first polarity sensing less than the full amplitude of the ac source voltage.

7. An electronic protection circuit in accordance with claim 1 and including
second storage means responsive to storing a charge from the second polarity of an applied ac voltage,
second switch means connected to the ac source operably switched on when the second polarity of the ac source exceeds a predetermined amplitude for a predetermined length of time, and
second gated semiconductor means connected to said second charge storage means and to said switch means, switching on of said second switch means gating on said second gated semiconductor means to permit the charge stored on said second charge storage means to be applied therethrough as a second outgoing trigger.

8. An electronic protection circuit in accordance with claim 7, wherein said second switch means includes a second slow-acting semiconductor breakover device.

9. An electronic protection circuit in accordance with claim 7 and including second divider means connected to the ac source voltage to provide a sensing point for second polarity sensing less than the full amplitude of the ac source voltage.

* * * * *